US007188028B2

(12) United States Patent
Chung

(10) Patent No.: US 7,188,028 B2
(45) Date of Patent: Mar. 6, 2007

(54) COLLISION PREVENTION AUTOMATIC WARNING SYSTEM

(76) Inventor: Yuan-Ting Chung, No 4, Lane 130, Nan-Kang Rd, Sec. 3, Taipei (TW)

( * ) Notice: Subject to any disclaimer, the term of this patent is extended or adjusted under 35 U.S.C. 154(b) by 337 days.

(21) Appl. No.: 10/761,600

(22) Filed: Jan. 20, 2004

(65) Prior Publication Data

US 2005/0159892 A1 Jul. 21, 2005

(51) Int. Cl.
*G06F 19/00* (2006.01)

(52) U.S. Cl. ...................... 701/301; 340/435; 340/436; 340/903

(58) Field of Classification Search .................... 701/1, 701/36, 301; 342/455; 340/435, 436, 903; 307/10.1
See application file for complete search history.

(56) References Cited

U.S. PATENT DOCUMENTS

| | | | | |
|---|---|---|---|---|
| 5,515,026 | A * | 5/1996 | Ewert | 340/436 |
| 6,587,043 | B1 * | 7/2003 | Kramer | 340/435 |
| 6,630,892 | B1 * | 10/2003 | Crockford et al. | 340/904 |
| 6,744,359 | B1 * | 6/2004 | Wasilewski et al. | 340/467 |
| 6,879,263 | B2 * | 4/2005 | Pederson et al. | 340/815.45 |
| 6,961,006 | B2 * | 11/2005 | Harter et al. | 340/903 |
| 6,980,092 | B2 * | 12/2005 | Turnbull et al. | 340/425.5 |
| 2003/0085621 | A1 * | 5/2003 | Potega | 307/18 |
| 2004/0001019 | A1 * | 1/2004 | Nakazawa et al. | 342/70 |
| 2005/0128062 | A1 * | 6/2005 | Lundsgaard et al. | 340/436 |
| 2005/0275522 | A1 * | 12/2005 | Nitz et al. | 340/471 |
| 2006/0028328 | A1 * | 2/2006 | Cresse | 340/435 |

* cited by examiner

*Primary Examiner*—Gary Chin
(74) *Attorney, Agent, or Firm*—Pro-Techtor Int'l Services

(57) ABSTRACT

The present invention provides a collision prevention automatic warning system, constructed to comprise a control circuit embracing a controller, a plurality of sensors, a light-emitter, a sound-emitter, an electric battery power supply, and a standby battery supply, therewith the system is installed in a vehicle. When a vehicle collision occurs, the sensor detects a signal and transmits same to the controller, whereupon the controller notifies the light-emitter and the sound-emitter, which thereupon emit a bright light and a loud sound respectively, and can also activate an automatic police reporting system, thereby promptly warning vehicles coming up from rear to pay heed to the collision and thus preclude further collisions from occurring, and having functionality to transmit a report to the police which can accelerate rescue time.

3 Claims, 1 Drawing Sheet

COLLISION PREVENTION AUTOMATIC WARNING SYSTEM

BACKGROUND OF THE INVENTION (a) Field of the Invention

The present invention relates to automatic warning systems, and more particularly to a prompt automatic warning system for use when a vehicle has broke down or an accident has occurred, thereby promptly warning vehicles coming up from rear to pay heed to the break down or collision and thus preclude further collisions from occurring, hence providing an even safer traffic environment, and safeguarding pedestrians.

(b) Description of the Prior Art

Serious follow-on collisions often occur, resulting in grave loss in life and property, involving general road traffic vehicles which are unable to warn vehicles coming up from rear of a break down or an automobile accident occurring ahead.

SUMMARY OF THE INVENTION

A primary objective of the present invention is to provide a control circuit assembled to comprise a controller, an input circuit with at least one sensor for detecting a collision, an output circuit having a light-emitter and a sound-emitter, and a power supply circuit with an electric battery power supply, and a standby battery supply. When a vehicle collision occurs, the collision sensor(s) detect the collision occurrence and transmits a signal to the controller, whereupon the controller notifies the output circuit light-emitter and the sound-emitter, which thereupon emit a bright light and a loud sound respectively, thereby promptly warning vehicles coming up from rear to pay heed to the collision and thus preclude further collisions from occurring.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
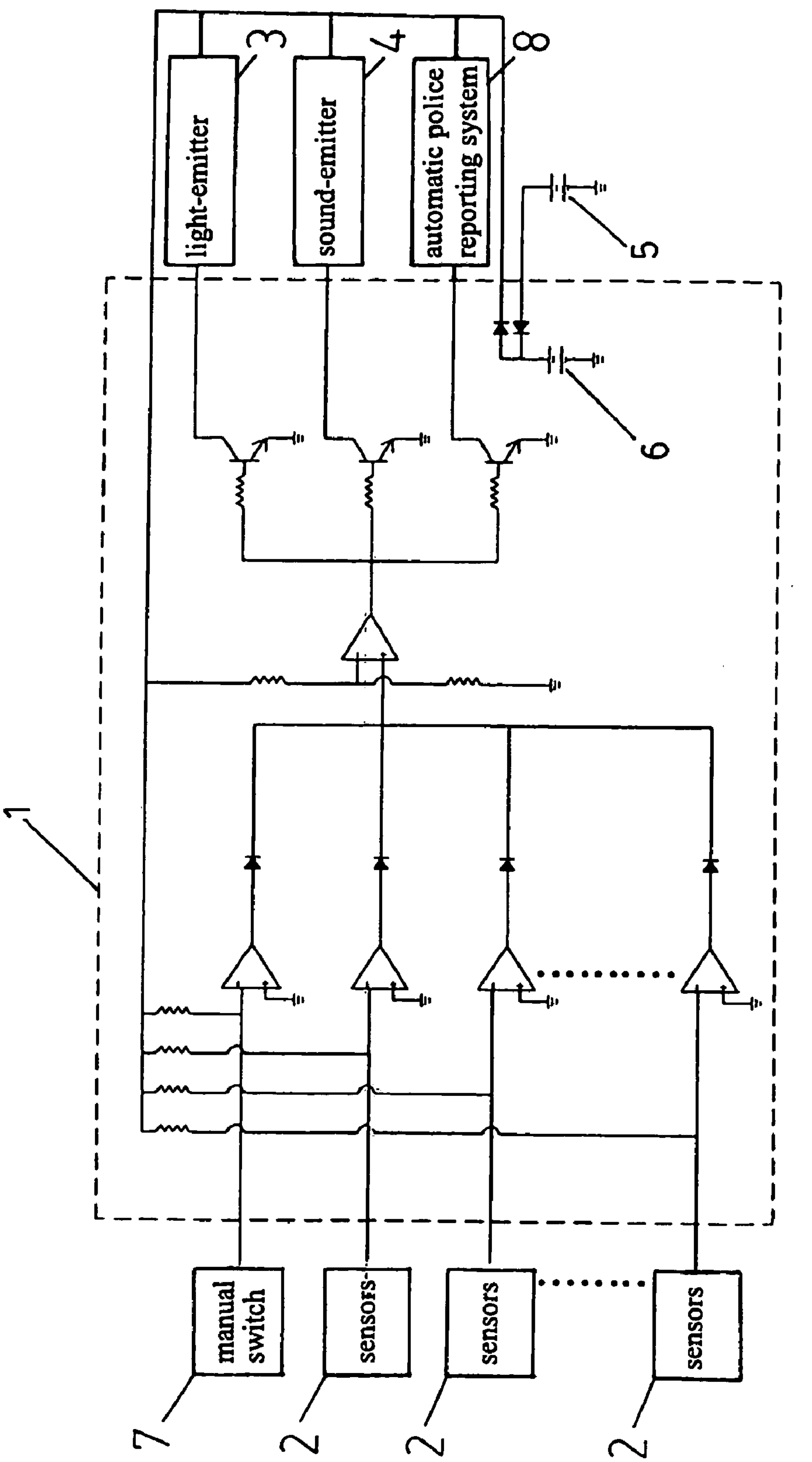
FIG. 1 shows a detailed circuit diagram according to the present invention.

An automatic warning system of the present invention is assembled to comprise components including a controller 1, an input circuit with at least one sensor 2, an output circuit having a light-emitter 3, a sound-emitter 4, and a power supply circuit using a vehicle electric battery power supply 5, and one standby battery supply 6 connected in parallel by an isolation diode. Wherein, one end of the controller 1 is linked to the input circuit having at least one parallel-connected collision sensor 2, and another end of the controller 1 is linked to the parallel-connected light-emitter 3 and sound-emitter 4. The aforementioned control circuit 1 utilizes electric power supplied by the externally connected vehicle equipped electric battery power supply 5.

When a vehicle collision occurs, the sensors 2 detect the collision and transmits a signal to the controller 1, whereupon the controller 1 notifies the light-emitter 3 and the sound-emitter 4, which thereupon emit a bright light and a loud sound respectively, thereby promptly warning vehicles coming up from rear to pay heed to the collision and thus preclude further collisions from occurring.

If a collision of small extent occurs, and the sensors 2 do not detect such and thus does not implement any action, a driver of the vehicle can switch the sensors on with a manual alert switch 7 located at a side of the driver, and connected in parallel to the sensors 2. The signal is thereupon transmitted to the controller 1, and as above, the controller 1 notifies the light-emitter 3 and the sound-emitter 4, which thereupon emit the bright light and the loud sound respectively, thereby promptly warning vehicles coming up from the rear to pay heed to the collision and thus preclude further collisions from occurring.

The output circuit 1 of the present invention can be additionally configured with an automatic police reporting system 8, which is enabled to link up with a police station. The automatic police reporting system 8 is connected in parallel to the light-emitter 3 and the sound-emitter 4, and thereby the automatic warning system of the present invention utilizes the automatic police reporting system to accelerate rescue time.

In conclusion, when the vehicle collision occurs, the sensors 2 of the present invention detect the collision_and transmits a signal to the controller 1, whereupon the controller 1 notifies the light-emitter 3 and the sound-emitter 4, which thereupon emit the bright light and the loud sound respectively, thereby promptly warning vehicles coming up from rear to pay heed to the collision and thus preclude further collisions from occurring, and the automatic police reporting system 8 can also concurrently transmits a report to the police, thereby accelerating rescue time.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A collision prevention automatic warning system, comprising:

a controller, adapted for determining that a collision has occurred;

an input circuit connected to said controller, having at least one parallel-connected collision sensor;

an output circuit having, parallel-connected, a light-emitter, and a sound-emitter; and a power circuit having an electric battery power supply and a standby battery supply, connected in parallel by an isolation diode;

wherein, the mutually parallel connected sensors are linked to one end of the controller, and the light-emitter and the sound-emitter are linked to another end of the controller; the control circuit utilizes electric power supplied by the electric battery power supply, and when the electric battery power supply loses efficacy, the standby battery supply is able to provide the required electric power;

further wherein, when a vehicle collision occurs, the sensors detects the collision occurrence and transmit a signal to the controller, whereupon the controller notifies the light-emitter and the sound-emitter, which thereupon emit a bright light and a loud sound respectively.

2. The collision prevention automatic warning system according to claim 1, further comprising a manual alert switch configured at a side of a driver, parallel connected with the sensors to one end of the controller whereby when the sensors do not detect any collision and thus do not implement any action, activating the manual alert switch also enables the light-emitter and the sound-emitter to emit the bright light and the loud sound respectively.

3. The collision prevention automatic warning system according to claim 1, wherein said output circuit can be linked to an automatic police reporting system, by parallel connection to the light-emitter and the sound-emitter, thereby providing functionality to transmit a report to the police, and thus accelerate rescue time.

* * * * *